Dec. 3, 1946. W. H. COLBERT ET AL 2,411,955

METHOD OF MAKING COLORED MIRRORS

Filed Jan. 25, 1943 2 Sheets-Sheet 1

INVENTORS
William H. Colbert
Willard L. Morgan.
BY
Corbett, Mahoney & Miller
ATTORNEYS Patented Dec. 3, 1946

2,411,955

UNITED STATES PATENT OFFICE 2,411,955

METHOD OF MAKING COLORED MIRRORS

William H. Colbert, Brackenridge, Pa., and Willard L. Morgan, Columbus, Ohio, assignors, by mesne assignments, to Libbey-Owens-Ford Glass Company, Toledo, Ohio, a corporation of Ohio Application January 25, 1943, Serial No. 473,474

9 Claims. (Cl. 117—35)

Our invention relates to a method of making colored mirrors. It has to do, more particularly, with a novel method for producing mirrors having desired color and reflectivity characteristics. More specifically, it relates to a method of producing mirrors of desired color by producing mirror films on which interference of light rays, which strike the films, acts to produce the color.

Despite the wide possible use of colored mirrors in furniture, store decoration, theater decoration and other decoration, sales displays, etc., and as automotive mirrors, and the possible use of colored reflective surfaces to add to the attractiveness of shaped glassware, there has been little use to date of such mirrors and surfaces due to the expense of producing them and the few shades available.

The accompanying drawings will aid in the understanding of our invention. In these drawings.

Figure 1:
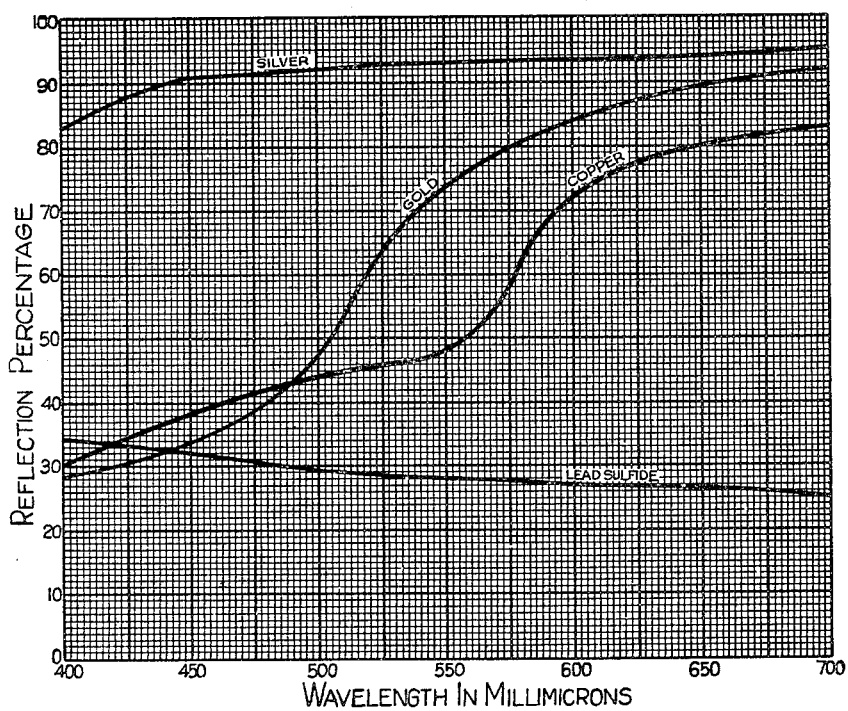
Figure 1 is a diagram showing spectral reflection curves for silver, gold, copper and lead sulfide mirrors of the prior art.

Silver mirrors, of 88–92% reflectivity value, made with clear ordinary plate glass have no color, since all the various light rays are reflected approximately equally, as seen from the spectral reflection curves in Figure 1. Some colored mirrors have been used commercially which were made by silvering colored glass, the color thereby secured being the color of the glass. The color of the glass arises from the fact that the glass absorbs some types of light rays more than others and the light rays which are transmitted, with the least absorption, thus impart the color to the glass. Thus, "Solex" green glass, made by Pittsburgh Plate Glass Company, is green because it absorbs much of the red and blue light out of the white daylight as such light passes through the glass. A green mirror, made with silver on the "Solex" green glass, shows a reflectivity value, for visible light, of 61% and similar mirrors, made with a blue glass and a flesh colored glass, showed reflectivity values of 35% and 68.5%. These are all lower than the reflectivity of silver on the colorless glass, by reason of the loss of the colored light, which the colored glasses absorb. The use of such colored glasses is expensive and, moreover, satisfactory quality for forming mirrors is not readily available.

Using plain plate glass, some colored mirrors have been made in which the color arises from the selective reflection of the various light waves of different colors to different degrees. Thus, gold mirrors show a spectral reflection curve, as shown in Figure 1 and copper mirrors show a spectral reflection curve as shown in Figure 1. The gold mirror appears yellow because little green or blue is reflected while much larger amounts of yellow and red are reflected, the overall reflectivity of total visible light for gold mirrors being about 75%. The copper mirror, which reflects about 55% of all light, is orangered, being different from the gold mirror in that most of the light reflected is red. Copper mirrors have not been commercialized due to the unreliable methods for their production. Gold mirrors are expensive and, therefore, have not gone into wide use.

The use of fuchsin or methyl violet dyestuffs in opaque layers for mirror surfaces has been suggested. Such mirror surfaces reflect 11.6% of the total visible light. Experience with such mirrors indicates that where such dyes are used as the reflective layer they must be present in fairly thick opaque layers and the reflectivity percentage is always low and the mirrors quite dark. The colors secured are invariably the complementary color to the normal color of the dyestuff when seen in solutions by transmission. Thus, methyl-violet gives a green mirror since the film transmits red and violet light and reflects, selectively, the green light which it does not transmit. Thus, the color in these mirrors arises solely by selective reflection, just as is the case with gold, which when viewed by transmission is green, the gold being relatively transparent to green light but opaque to the red and yellow light which it reflects selectively. Mirrors of this type are not stable, the films rapidly breaking up and spotting and in service the color soon changes to muddy non-reflective grays. As a result they have had no commercial use in spite of the demand for colored mirrors.

Mirrors made with platinum, iridium, or aluminum are silvery in appearance and without color, while those made with chromium, silicon, or lead sulfide are dark and without color tone. Likewise glass coated with asphalt or black paint, with reflectivity values of 5%, and mirrors of black opaque glass, with 5% reflectivity, are not very useful because of their extremely low reflectivity values and the very dark images which thus appear in such reflective surfaces.

Thus, despite the wide possible use of colored mirrors and colored mirror surfaces, there has been little use to date because of the expense of producing such mirrors and surfaces and the few colors and shades available, as shown above.

One of the objects of our invention is to provide an effective method of making colored mirrors or other reflective surfaces of a wide range of color characteristics and of a wide range of reflectivity percentage characteristics which can be controlled as desired.

Another object of our invention is to provide a method of making mirrors or other reflective surfaces of various colors and reflectivity values in which the colors are mainly secured by light interference effects and are permanent and inexpensive.

Another object of our invention is to provide a method of making mirror films of such a nature that a film of a predetermined thickness can be obtained.

Various other objects will be apparent from the following description.

The colors which appear in thin-walled soap bubbles and in very thin oil films do not arise from any inherent color in the soap film or in the oil. Also, in these cases, it is well recognized that the colors do not come from any selective color light-absorption effects, as the soapy water and oil do not show any color directly. As the soapy water and oil in bulk are also clear and transparent and non-reflective, it is apparent that the colors do not arise from any selective reflection of light. The colors are known to occur from interference of the light rays, which results in a neutralization or loss of certain colored lights and the residual light which then appears is, obviously, colored. The particular color of light ray removed by interference is dependent upon the thickness of the film and its refractive index, as will be shown later. It is well known that interference colors can only appear in extremely thin films which are of a thickness comparable to one-fourth the wave-length of light and which are at least partially transparent.

We have found that by depositing reflective coatings of various materials in extremely thin films which are still partially or considerably transparent, we can secure a wide range of colored mirrors of various reflective characteristics for the various rays of light and in terms of total light reflection. We obtain these effects by simple and inexpensive means and colored substances or colored glass are not necessary. The colors are permanent and do not fade or alter, as they are dependent upon physical light interference effects.

We have found that by the controlled deposition of very thin uniform semi-transparent films of many materials we can secure reflecting bodies of a wide range of color and reflectivity characteristics. The material used as the reflecting substance need not have any inherent color.

Figure 2:
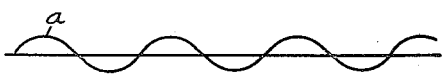
Figure 2 is a diagram illustrating light waves of a single ray of a definite color.
Figure 3:
Figure 3 is a diagram illustrating light waves of two rays of the same type vibrating in the same wave phase.
Figure 4:
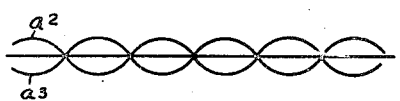
Figure 4 is a view similar to Figure 3 but showing the rays vibrating in opposite phase.

The development of colors by light interference has been explained upon the basis that light radiations are of a wave form, such as shown in Figure 2, which represents a single ray $a$ of a definite color. Blue light differs from red in that the length of the waves is shorter, in the case of the blue, and longer, in case of the red. The other visible colored rays of light are of intermediate wave lengths. White light is composed of a mixture of all of these visible rays. If two rays of the same monochromatic type or wave length happen to be vibrating in the same wave phase, as shown at $a$ and $a'$ in Figure 3, they amplify each other and the intensity is increased. However, if they happen to be vibrating in opposite phase, as shown at $a^2$ and $a^3$ in Figure 4, they interfere with or oppose each other and a loss of light intensity results. Thus, if in some way we can make some of the blue rays in ordinary white light get out of phase with other blue rays of the same wave length, we can remove some of the blue from the ordinary light. The remaining light will then no longer be white but of a color resulting from the remaining green, yellow, orange and red rays and will appear a reddish-yellow color.

Figure 5:
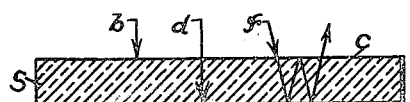
Figure 5 is a diagram illustrating how various light rays will be reflected from a reflecting surface.

If we consider two light rays impinging upon a reflecting substance $s$, as in Figure 5, and assume that ray $b$ is reflected at the top surface $c$ while ray $d$ passes on through the semi-transparent base $s$ to the bottom surface $e$ before it is reflected, it is apparent that the second ray has had a longer path to travel before it again emerges from the top surface $c$ of the layer $s$. Thus, the ray $d$ lags considerably behind the ray $b$ and in consequence, the crests and troughs of the waves of the two rays may not necessarily coincide. The time difference between the waves of rays $d$ and $b$ can be arranged so that the difference in phase is such that interference of the waves of two of such rays, entering or being reflected at any point on the surface of $s$, will occur. The time difference between the waves of the two rays will be dependent upon the thickness of the layer $s$ and the speed with which the given light ray travels in the material comprising the layer $s$.

As the number of complete wave cycles which any given monochromatic light ray makes per second or its frequency is a fixed constant, the variation in speed of travel of the light ray in different media causes a shortening or lengthening of the actual length of a wave as it travels through the various media. Wave lengths for light are generally given with reference to their values in traveling through air and the speed of travel for all light rays in this medium is given as 299,910,000 meters per second. In denser materials, the light rays move slower and all the light rays do not necessarily move at the same speeds. The proportionality constant N between the velocity of light in a given substance and the velocity of light in air is called the refractive index for that substance.

$$N = \frac{\text{Velocity in air}}{\text{Velocity in substance}} = \frac{\text{Wave length in air}}{\text{Wave length in substance}}$$

If by $\lambda_a$ we indicate the wave length in air and by $\lambda_s$ the wave length in some other substance, it is apparent that these are simply related as follows:

$$\lambda_s = \left(\frac{1}{N_s}\right)\lambda_a$$

N varies somewhat with different monochromatic waves of different wave length but a similar equation holds for each wave length considered. In general, as the variations are usually small, a single constant for N can frequently be applied for all waves in the visible light range.

In order for the ray $d$ to come out of the top surface and be 180 degrees out of phase and to thus interfere with the ray $b$, assuming both rays to be striking the surface of the layer substantially at right angles, the ray $d$ must be slowed down in time and distance equal to the distance of one half of a wave length of the ray in air, i. e., $$\frac{\lambda_a}{2}$$

As the ray is traveling only 1/N as fast in the substance $s$, comprising the layer, and must traverse the thickness of the layer twice, the thickness of $s$ required to cause an equivalent slowing effect is then $$\frac{\lambda_a}{4N_s}$$

In a similar way, thicknesses equal to 1, 3, 5 or any uneven integral multiples of this quantity should also show interference effects. If the ray $d$ is reflected within the layer $s$ not once but two times, it is apparent that the film needed for interference need be only $$\frac{\lambda_a}{8N_s}$$

thick. Thus, as shown in Figure 5, wherein the ray $f$ is shown as an inclined ray striking the surface of the layer the light ray is reflected twice within the layer. If the ray is reflected any number of times, such as R times, then the film needed is thinner and is of a necessary thickness as given by $$\frac{\lambda_a}{4N_s R}$$

Furthermore, it is apparent that similar thicknesses equal to 1, 3, 5, or any uneven integral multiples of such quantities will show interference effects with rays which are multiply reflected within the layers. Thus, the suitable film thicknesses for our films are of the order of one-fourth of a wave length of any visible light ray or some small multiple or submultiple of this, divided by the refractive index of the material used in the film.

Since the various colored rays of light have different wave lengths and these range from 4000 to 7500 Angstrom units or 0.4 to 0.75 micron or thousandth millimeters in the visible spectrum, it is obvious that a film which is thick enough to cause interference with the short blue rays will not cause interference with the long red rays, etc. Thus, each thickness of film will take out certain defined portions of the spectrum and a film will take on a series of different colors as the thickness is varied. As will be shown in the examples which follow, the colored mirrors of our invention produced by light interference, show varied colors, depending upon the thickness of mirror film employed. In the spectral reflection curves for these mirrors, the portion of the curve and minima of reflectivity caused by interference shifts from the blue range of wave length toward the red, as the film is made thicker. The film must be of very uniform thickness, if the color is to be the same throughout the mirror. This has called for special means of producing such mirrors, in view of the extreme uniformity and extreme thinness of the mirror layers desired. On the other hand, it is within the scope of our methods to produce colored mirrors of mottled or variegated colors where the film thicknesses are deliberately varied to cause such effects.

Interference effects in perfectly transparent materials do not occur beyond about the ninth multiple of the quarter wave length factor already described. In semi-transparent materials, the increasing absorption of light by the increasing thickness of film, which is exponential with respect to the thickness, may soon leave so little light reflected from the bottom surface $e$ that no interference effect can be found in the reflected light which is then coming entirely from the top surface $c$. Obviously if a mirror is opaque all of the light is absorbed before ever striking the surface $e$ and, therefore, no light is thrown back to cause interference effects, particularly, as the film obviously must be traversed twice if interference is to be obtained. Since most commercial mirrors have been made with mirror layers thick enough to be opaque, they have not shown any interference colors and their entire reflection occurs at the top surface of the mirror layer. The occurrence of interference by multiple reflection within the layer, as shown in Figure 5 with ray $f$, is very quickly limited by the transmission values for the film and, in practice, we have not found evidence for more than two to four such internal reflections although more may occur in more highly transparent films.

It is thus apparent that the amount of light which may be reflected from the bottom surface $e$ of our semi-transparent mirror film is a function of the transparency of the material used, for the wave length being considered or the wave lengths constituting ordinary visible light. As this is the light available for interference in most cases for our mirrors, we use films which are semi-transparent or which show a transmission between 10 and 90% in the thicknesses employed.

The amount of light reflected from the top surface of the layer is a function of the refractive index, being greater the larger the refractive index for the substance, and we find it also becomes greater as the thickness of the film increases until it is opaque. While it may thus be an advantage to use a material for the mirror film which has a high refractive index to secure greater brilliancy of reflection and to permit the use of thinner, more transparent films, thus giving greater efficiency of light removal by interference and thus giving purer and deeper color tones, we do not restrict ourselves to the use of any particular range of refractive index materials but may use a wide range of substances. It is apparent that a material of about 50% reflectivity value, when viewed in a normally opaque thick film, which can be laid down in very thin films which are of high transparency, will show the brightest and deepest interference colors as mirrors. We may, however, use materials which in their ordinary opaque films or in bulk show much higher or lower reflectivity values than this and are not restricted to any range in this constant, although values lying between 80 and 20% are preferred. Thus, thin calcium fluoride coatings will reflect something less than 10% of the light at the top surface and are very transparent and the reflected light coming from the back surface causes interference colors to develop but the depth of color resulting is low due to the white light mixed with the colored light being of a high intensity. It is necessary that the film used for our mirrors have the characteristic of giving specular or mirror type reflection of light, since diffuse type reflection is not satisfactory.

We have found the use of very thin films of lead sulfide to give particularly attractive results. In its use in the normal opaque mirrors of fairly thick films, it is a practically colorless mirror, as shown by Figure 1, which shows the reflectivity, about 30%, for all the wave lengths of light to be about the same. It has a high refractive index of 3.9 and is quite transparent in the thicknesses which will cause interference effects. Gold, having a refractive index of 1.18 at 4400 Angstroms and of 0.47 at 5890 with a normal reflectivity curve, as shown by Figure 1, is quite transparent in very thin films to green light. So also is copper which reflects, as shown in Figure 1, when in opaque films and which has a refractive index of 1.10 at 5000 Angstroms and 0.44 at 6500. Both of these may be used by us in providing mirrors of a range of colors, when used in films which are semi-transparent and which are sufficiently thin to cause color development through light interference effects. Other sulfides of a metallic luster, such as stibnite and molybdenite, having a refractive index of 4.3, and each of about 40% general reflectivity in the visible range with a slight bluish cast, are quite suitable. Pyrite, which reflects a maximum of 60% in the red and minimum of 45% in the blue, may be used as may also silicon, normally of about 38% reflectivity, and having a refractive index of 3.8 to 4.2. Antimony, having a refractive index of 1.62 and a reflectivity of about 55%, can possibly be used. Fluorite or calcium fluoride, having a refractive index of 1.43, and other fluorides of about the same refractive index, may be used as a reflective layer, although these very transparent substances are of low reflectivity values, as previously mentioned. Thus, for fluorite the estimated reflectivity value would be 3 to 4% uniformly throughout the visible range and very thin films of this material give low reflectivity value mirrors of this order which are of light interference tints.

It is also possible to use films, which are in the desired extreme thin range and which cause interference coloration of mirror type reflectors, in which the film is a jointly deposited mixture, chemical combination, or alloy of film-forming materials. For example, a jointly deposited mixture of gold and lead sulfide is suitable. It is obvious also that two or more extremely thin laminae, both semi-transparent, of two different substances may be used cooperatively to secure the interference colors.

While no color need be present in the material used as the reflecting substance, such as in the case of lead sulfide, the use of such materials as gold, showing selective specular reflection, brings an additional source of possible variation of both the hues and spectral reflectivity characteristics. The choice of a material for the reflective film which has color characteristics in its normal reflection, such as gold, imposes its normal reflection spectral limits, to some degree, on the general nature of the light reflected by the film and from which various spectral components are then subtracted by the light interference effects, depending on the thickness of the film used and its refractive index. Thus, in general, mirrors made with a very thin gold film are of higher total reflective values and thus brighter, and also of particularly higher reflectivity in the yellow and red, than are similar mirrors having films of lead sulfide, although in each the color is derived, to a main degree, by the color interference effects in combination with the normal reflective characteristics. Thus, with the lead sulfide which, as a normal opaque mirror, reflects all colors about equally at around 30%, as shown in Figure 1, the interference mirrors secured do not greatly exceed 30% in reflectivity value and the whole spectral range of colors are found in the mirrors so produced. With the very thin copper film mirrors, in which interference is acting, the reflectivity values do not exceed 55% and the colors secured are mainly bright reds, the blue and green waves being definitely weak. Similarly, cuprite or cuprous oxide, which is a bright red and giving a reflectivity in bulk of about 20% and has a refractive index of 2.7, can be used as a film base for interference color development and mirrors of the complete spectral range can be secured. Ordinary cupric oxide has been found to be extremely satisfactory in making mirrors colored by light interference.

Not all materials may be used for the forming of our thin semi-transparent mirror films in order to produce interference colors. Silver has been the mirror material most widely used for the ordinary opaque type mirrors and has also been used somewhat as a colorless semi-transparent so-called "half mirror." However, metallic silver is not useful for the making of our mirror films. This arises from the fact that all three factors which must be considered in producing our films are of extreme and unfavorable values in the case of silver. First, its high reflectivity, 90% in bulk, permits little light to be passed to the second or back surface $e$ of the thin films. Second, the films of silver have an extremely high absorption capacity for light and none of the small amount of light, which might possibly get to surface $e$, gets back again to the top surface. Consequently, there is no light to cause interference effects or colors. The absorption coefficient for light in the visible range is 10 to 30 times greater for silver as compared to similar thicknesses of other metallic substances. Silver is thus a very highly opaque substance. Third, it also has a very low refractive index, this being 0.17 for the visible range and, in consequence, quite thick films would be necessary to cause interference effects. Thus, for green light of 5000 Angstron units or 0.5 micron wave length $$\frac{\lambda_{\bullet}}{4N_{\bullet}}$$

calculates as 0.74 micron. At this thickness, silver shows a transmission figure of only 1.5%, and as the reflected ray which arrives at the top surface $c$ must traverse an equal thickness it is apparent that the amount of light which might get back to surface $c$ and cause interference would be only 10%×1.5%×1.5% or 0.002% which would be entirely negligible. Most commercial silver mirrors are 0.10 to 0.12 micron thick. Aluminum, which is of equally high reflectivity and a refractive index of 1.44 and a fairly high degree of opacity, is also not useful in forming mirrors colored by interference for similar reasons.

While our mirrors receive their colors from the thin reflective film used, it is apparent that we can also modify the range and reflective characteristics secured by our mirrors, thus primarily colored by interference effects, by using in place of colorless glass, as the mirror support, a colored glass or other colored support body of transparent nature. The color absorption characteristics of the support will limit the total reflectivity percentage possible and shift the general tones of color in the direction of the color of the glass used.

Figure 6:
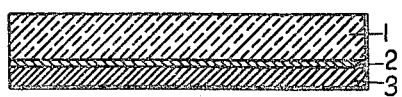
Figure 6 is a transverse vertical sectional view of a mirror made according to our invention.

In the sectional view constituting Figure 6, we illustrate a second-surface mirror made according to our invention, and which will consist of a glass or other support 1, the semi-transparent mirror film 2, and the protective coating 3.

In order to secure the necessary uniformity of thickness in the thin semi-transparent mirror films and thereby secure uniformity of color and reflectivity characteristics throughout a mirrored body and to secure control of the deposition rate such that a desired thickness of film and consequent color of mirror can be readily arrived at, we have found it necessary to develop special methods of forming our mirror film.

According to our method, the mirror films are deposited chemically but the deposition reactions must be greatly retarded, as compared with former operations. Thus, the reaction mixtures and temperatures of deposition must be changed toward slowing down the entire deposition process and must also be changed further since such slowing down of deposition with the usual formulae employed in mirroring results in highly uneven and irregular development. Thus, it is also necessary that changes be made in the formulae toward giving more uniform and even development of crystal nuclei and even slower than normal rates of growth onto these nuclei once they are formed.

We have found that thin metallic sulfide films, which are semi-transparent and give colors by interference, can be readily deposited by the use of special mirroring solutions and by the use of special chemicals which retard the rate of deposition of the sulfides.

We use aqueous mirroring solutions which, at the time of reaction, contain sodium or potassium alkali and an organic sulfur compound which readily breaks down in such alkali solutions to produce sulfide at a slow rate. We have found thiourea, thiosinamine, or allyl thiourea, and the amino acid cystine to be particularly useful as the sulfur compound. In addition, the mixed solutions also contain a metallic salt which is later converted into the metallic sulfide. Thus we may use lead, thallous, or zinc salts to secure mirror films of lead sulfide having a refractive index of 3.9, thallium sulfide or zinc sulfide, which is white, having a refractive index of 2.4. If we use cadmium, silver, or copper salts, we also use at least enough ammonia to keep the hydroxides of these metals in solution in the strong alkalies when mixed therewith. In these cases, the mirror films will be cadmium sulfide having a refractive index of 2.5, copper sulfide having a refractive index of 2.69 and silver sulfide. The cadmium sulfide is yellow by its normal reflection and transmission, while the others are substantially colorless.

The alkali, organic sulfur compound, and metallic salt are made up as separate solutions and these solutions are mixed together just prior to pouring the same on the glass or other support material to be mirrored.

To any one of these solutions, we may beforehand add small quantities of the materials we have found to have a very pronounced action in retarding the rate of the chemical deposition. We find the addition of very small amounts of sodium potassium tartrate to have a great effect in slowing down the reaction. With this retarder there is secured a very uniform deposition, in contrast to the usual non-uniform deposits given when mirrors are formed very slowly. It is believed that our retarders, such as sodium potassium tartrate, secure these effects by possibly decreasing greatly the rate of growth of the metallic sulfide on already deposited nuclei. This leads to higher degrees of supersaturation of metal sulfide in the solutions and, consequently, greatly increased numbers of nuclei are formed. This results immediately in much greater and more uniform coverage of the glass surface at the start of the deposition and then the very slow rate of growth of further deposited material onto these numerous nuclei, gives slower growth and more uniform growth of the deposit in every direction. It is apparent that only very small amounts of the retarder materials are necessary. We have, however, used by weight in the final mixed solution, concentrations of up to 6%. Other materials which we have found useful as retarders in our deposition processes are gelatine, gum arabic, citric acid, sodium lactate, lactic acid, soluble starches, dextrines, cane sugar and invert sugar or the dextrose or levulose sugars therein. All of such substances are organic compounds containing hydroxyl groups and will react to form complex compounds with metallic salts the sulfides of which are water insoluble.

As the extremely thin coatings are frequently quite fragile and easily scratched or otherwise spoiled, we generally coat these with pigmented or colored paint, lacquer, or shellac coating, or we may back the semi-transparent film up with another mirror film of an opaque character. By so backing up our mirrors, viewing of the background through the semi-transparent mirrors is eliminated. The sectional view of Figure 6 illustrates a second surface mirror, made according to our invention and which will consist of a glass or other support 1, the semi-transparent mirror film 2, and the protective coating 3.

As the rate of chemical deposition of mirrors is influenced by the temperature, we have found it very necessary in order that we secure entirely uniform deposition rates and uniform thicknesses of deposit over large areas of glass, that all glass, machines, and materials used in the deposition be at the same temperature, preferably ranging from 60 to 90° Fahrenheit. With the temperature controlled accurately, as within a thermostatically controlled air-conditioned room, the deposition rate always proceeds at the same rate, if the solution mixture is kept the same. As a result, film thicknesses are directly determined by the time of deposition and a constant color of mirror can be produced by merely running the depositions for a constant time.

Thus, we employ an alkali solution, a solution containing an organic sulfur compound, and a solution containing a metal salt. These solutions are made up separately and are combined just prior to pouring on the glass or other support to be mirrored. As previously indicated, one of these solutions will contain the retarder. The retarder is used in amounts which may range up to 6% by weight of the final mixed solutions. The final mixed solution will contain up to 2% by weight and no less than 0.5% of alkali. The sulfur compound will be present in the final solution in amounts ranging from 0.2% to 5% by weight. The metal salt will be present in the final solution in amounts ranging up to 2% by weight.

The percentage of thiourea is not critical but the alkali hydroxide must be present in at least a quantity sufficient to maintain all of the metal salt hydroxides in solution. Increasing the alkali content speeds up the deposition rate and larger quantities of retarder are used with larger amounts of the caustic alkalies. Ammonia is used only where the metallic hydroxides are not soluble in the caustic alkali solutions and in general sufficient ammonia is used to prevent precipitation of the metal hydroxides. In general one to three times as much strong ammonia must be used in volume as compared to the weight of the metallic salt.

The nature of our new mirrors and their methods of formation will be apparent from the following examples. In Examples Nos. 1 to 16, the mirror base material is lead sulfide deposited by special chemical means, the examples being of different film thickness and of consequent different colors and spectral and total light reflective characteristics, the various mirrors being secured by varying the time of deposition of the lead sulfide under controlled conditions.

*Examples 1 to 16*

Ordinary plate glass is thoroughly cleaned, scrubbed with rouge and then rinsed thoroughly several times. The wet glass is then ready for mirroring. The mirroring is carried out at 68 degrees Fahrenheit and the solutions, glass and machines are all brought to this temperature by doing all the work in a constant temperature room regulated to this condition. This gives uniform conditions and with the mirroring solution used, the deposition proceeds at a constant rate so that the thickness of deposit is determined by the time the solution is permitted to act. Three aqueous solutions are made up for use as follows: Solution A, which contains 3.18% of sodium hydroxide and 0.00054% of sodium potassium tartrate. Solution B, which contains 3.7% of lead acetate and 0.264% of acetic acid. Solution C, which contains 2.64% of thiourea. These three solutions are mixed together in equal quantities just prior to their being poured onto the glass. The mixed solution at the time of pouring is of the following composition:

| | Per cent |
|---|---|
| Sodium hydroxide | 1.06 |
| Lead acetate | 1.23 |
| Thiourea | 0.88 |
| Acetic acid | 0.888 |
| Sodium potassium tartrate | 0.00018 |

As compared with the method of forming lead sulfide mirors shown in the patent to Colbert et al., 1,662,564, of March 13, 1928, it is seen that we use a higher concentration of lead acetate and a lower concentration of thiourea. These changes have the effects of increasing to some degree the laying down of the nuclei uniformly and of slowing down the rate of reaction. These effects are also enhanced by the use of a temperature of 68 degrees Fahrenheit in contrast to the 95 degrees or higher ordinarily employed in depositing lead sulfide mirrors. However, these changes alone have been found to be insufficient as it generally occurs, when mirror deposition is slowed down, that the securing of uniform deposits becomes more difficult. As it is particularly necessary that the thin mirror films be extremely uniform because of their consequent variation in color, if not, and also because of their semi-transparent nature, we have found it necessary to add a new substance having a retarding effect on the deposition rate and one which facilitates very uniform deposition. This substance is preferably sodium potassium tartrate. It is believed that the sodium potassium tartrate, which is used in very small amounts as it has a substantial effect, operates by possibly decreasing greatly the rate of growth of lead sulfide on already deposited nuclei. Thus, greater numbers of nuclei are apparently caused to form and the growth on these nuclei becomes slow and uniform in every direction. While the deposition rate of the formula of Patent 1,662,564 can be decelerated by working even below 68 degrees Fahrenheit or by using less alkali, neither of these procedures will give satisfactory uniformity for the making of good interference colored mirrors. The use of the small amount of sodium potassium tartrate is thus very desirable, although we have found that other materials may be used as previously indicated.

In order to overcome the limiting of the amount of solution in contact with the glass at its edge by surface tension effects and the variation in deposit thickness at the edges, as a consequence, we have found it preferable, in order to secure very uniform results, to place the wet glass to be mirrored in a stainless steel pan, precoated with lead sulfide, and to rock the pan about 35 times a minute using a metal frame insert in the bottom of the pan to keep the glass from shifting. Approximately 2.8 cc. of mixed solution per square inch of glass to be treated is poured over the glass in the tray and the rocking keeps this liquid uniformly flowing over the surface of the glass during the entire deposition.

With our new mixed solution, after about 8.5 minutes from the time of pouring, a darkening of the glass can first be noticed and the thickness of mirror film becomes progressively greater as the time increases. If the deposition is allowed to proceed for about 60 minutes, a completely opaque ordinary type lead sulfide mirror is secured, in which the thickness of coating is about 0.140 micron. Mirrors of this thickness with lead sulfide are usually laid down in about 7 minutes, using the solution of Patent No. 1,662,564, and these mirrors show no color, as indicated by the spectral reflection curve of Figure 1, and are opaque. For the spectral reflectivity curve shown, the total reflectivity is 29%.

By adding a large amount of water to the pans at the times indicated in the following table, the mirrors comprising Examples 1 to 16 were made and are of the various colors and spectral and optical characteristics shown. Diluting the solution with a large amount of water stopped the deposition reaction. The mirrors were then flushed with considerable water and the surface cleaned by gently rubbing with wet cotton. After being dried, preferably by warm air, the films, which were semi-transparent as shown, were immediately coated with a black lacquer and then with a thick coat of a pigmented paint for protection against scratching or other destructive influences.

reflectivity spectra at the thicknesses of film given which correspond to the ratio of $$\frac{5\lambda}{16N}$$

Interference at these thicknesses would be only

| Example No. | Time of forming, minutes | Color | Total percent reflectivity | Total percent transmission | Spectral minimum | Film thickness, microns | Wave factors | No. of times ray reflected |
|---|---|---|---|---|---|---|---|---|
| 1 | 12.3 | Bluish gray | 33.8 | 45 | 7,500 | 0.024 | $\frac{\lambda}{8N}$ | 2 |
| 2 | 13.3 | Pale yellow | 35.7 | 42 | 4,000 | .026 | $\frac{\lambda}{4N}$ | 1 |
| 3 | 14.2 | Bright yellow | 34.4 | 40 | 4,400 | .028 | $\frac{\lambda}{4N}$ | 1 |
| 4 | 15.2 | Orange yellow | 31.7 | 37 | 4,700 | .030 | $\frac{\lambda}{4N}$ | 1 |
| 5 | 16.1 | Red yellow | 28.2 | 35 | 4,950 | .032 | $\frac{\lambda}{4N}$ | 1 |
| 6 | 17.7 | Purple red | 24.9 | 33 | 5,250 | .034 | $\frac{\lambda}{4N}$ | 1 |
| 7 | 18 | Red purple (mauve) | 21.6 | 30 | 5,500 | .036 | $\frac{\lambda}{4N}$ | 1 |
| 8 | 19.4 | Purple | 21.2 | 28 | 5,900 | .038 | $\frac{\lambda}{4N}$ | 1 |
| 9 | 20.6 | Purple blue | 20.9 | 26 | 6,300 | .040 | $\frac{\lambda}{4N}$ | 1 |
| 10 | 22.6 | Clear blue | 19.8 | 23 | 6,850 | .044 | $\frac{\lambda}{4N}$ | 1 |
| 11 | 23.3 | Blue green | 20.0 | 21 | 7,300 | .046 | $\frac{\lambda}{4N}$ | 1 |
|  |  |  |  |  | 4,600 | .046 | $\frac{5\lambda}{16N}$ | 1 |
| 12 | 24 | Grayish pale yellow | 21.8 | 19 | 4,800 | .047 | $\frac{5\lambda}{16N}$ | 1 |
| 13 | 24.4 | Grayish yellow | 23.2 | 18 | 4,950 | .048 | $\frac{5\lambda}{16N}$ | 1 |
| 14 | 25.6 | Grayish red | 24.8 | 17 | 5,200 | .050 | $\frac{5\lambda}{16N}$ | 1 |
|  |  |  |  |  | 7,200 | .050 | $\frac{3\lambda}{8N}$ | 2 |
| 15 | 28.5 | Grayish purple | 24.8 | 16 | 5,800 | .056 | $\frac{5\lambda}{16N}$ | 1 |
| 16 | 33.2 | Silvery blue | 21.8 | 12 | 6,700 | .065 | $\frac{5\lambda}{16N}$ | 1 |

Figure 7:
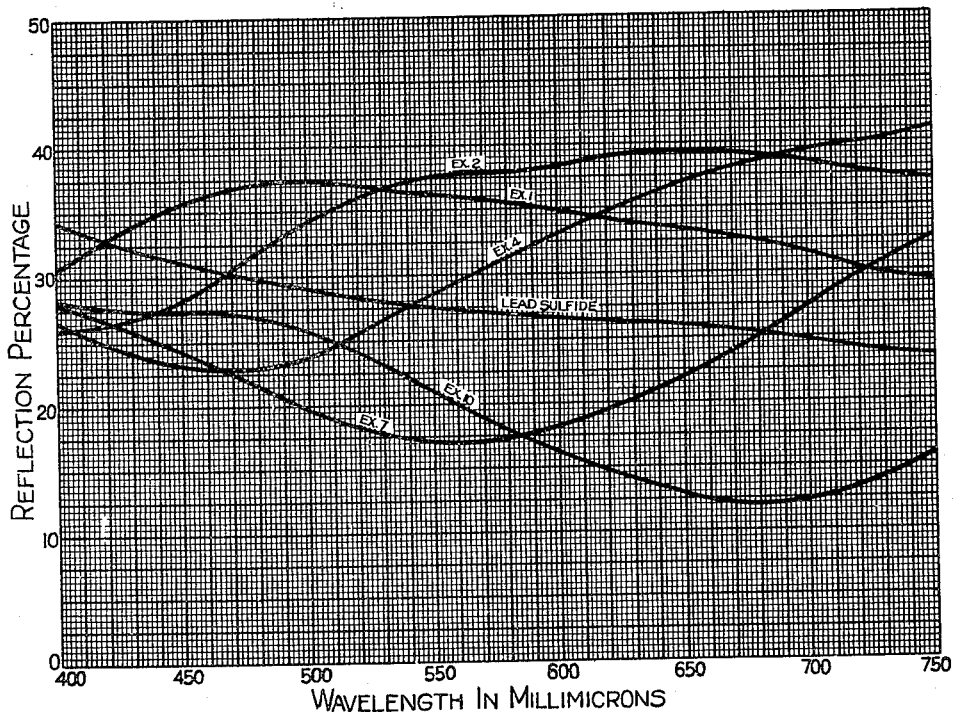
Figure 7 is a diagram illustrating spectral reflection curves of certain examples of mirrors made according to our invention.
Figure 8:
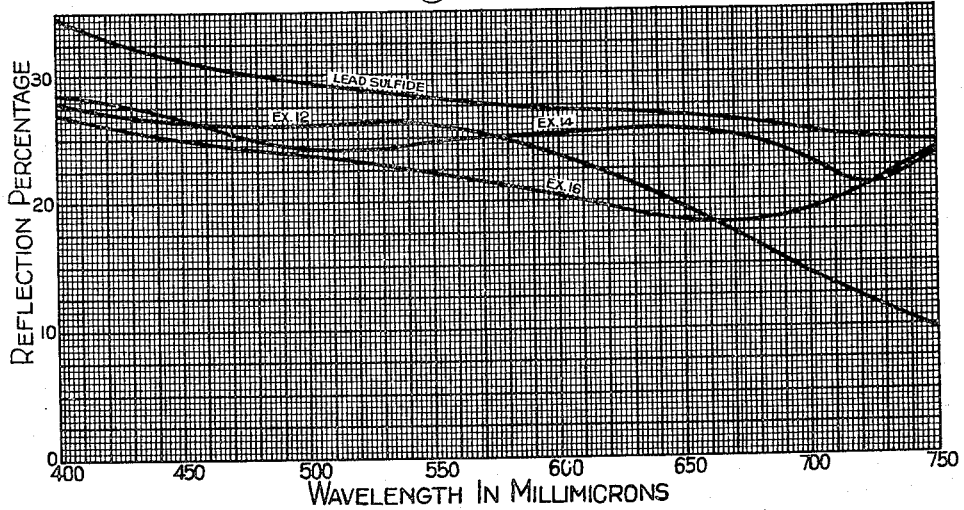
Figure 8 is a view similar to Figure 7 illustrating spectral reflection curves of certain other examples of mirrors made according to our invention.

Each of the mirrors was perfectly uniform in color and a good reflector. As will be seen in the table, the spectral range was gone through twice. In the first series of colors, as shown in Examples 1 to 11, the color tones are very clear and bright. The spectral reflectivity curves for Examples 1, 2, 4, 7 and 10 are shown in Figure 7, the numbering of the curves being the same as the example numbers. For comparison, the spectral reflectivity curve of the ordinary opaque film lead sulfide mirror given in Figure 1 is drawn in to this set of curves, as well as into Figure 8 which shows the spectral reflectivity for colored mirror Examples 12, 14 and 16. The minima in the spectral reflectivity curves shows the light rays which are being diminished in the reflected light by interference. As would be expected for interference effects, the minima continually shift in the samples toward the longer red rays as the film thickness of the lead sulfide in the examples is increased. In Examples 2 to 11, the film thickness, at which the interference minima occur with the different light waves, is related to the wave length by the ratio of $$\frac{\lambda}{4N}$$

The apparent color of the mirror is plainly dependent upon the color of the light removed by interference. Thus, in Example 10, the light removed by interference is in the red and, in consequence, the mirror appears blue since this is the main residual type of light.

partial and the minima in the curves are very shallow. As a result, the colors are not of as bright or distinct tones as occur in the first series of mirrors.

In mirrors Examples Nos. 1 and 14, reflected interference rays and minima occurred in the deep red end of the spectra at film thicknesses corresponding to $$\frac{\lambda}{8N}$$

and $$\frac{3\lambda}{8N}$$

respectively. In these, the red rays were evidently reflected twice within the mirror film before emerging, as illustrated in Figure 5 by ray (f). The lead sulfide film is highly transparent in the deep red and this higher transparency makes interference by the doubly reflected red rays possible.

By way of further proof and demonstration that the colors originate from interference effects, the depth of the decrease in the light at the minimum in Example No. 7 will be calculated. The minimum occurs at 5500, where the reflection from Figure 4 of opaque lead sulfide is 28%. Some 72% of the ray 5500 passes into the semi-transparent lead sulfide film which, in the thickness present, was 30% transparent. However, the ray must also travel back through the same thickness again and if no light is lost amount of light returned to the top surface of the lead sulfide would be 72%×0.30×0.30 or 6.1%. This would destroy an equal amount of the same 5500 light or the total loss should be 12.2%. Thus, the reflectivity for 5500 should be 28%—12.2% for this film or 15.8% and the spectral reflectivity curve, for Example 7, shows a reflectivity for 5500 of 17.5%, which is close to the expected figure. In a similar calculation for Example 10 for the ray 6850, the calculated interference ray would destroy 8% and indicate a net reflectivity of 18% for this red ray. The actual reflectivity is lower, being only 12.5% and is in line with the fact that as lead sulfide is more transparent to red rays than to light generally, then more light would be thrown back to cause interference than use of the general light transmission of 23% would indicate.

As illustrated in Figure 7, where the films are extremely thin they show higher reflectivity values than the lead sulfide in its opaque films. Here the waves reflected at the even quarter wave length, differences of path which are in phase with the light being reflected at the surface, amplify the light intensity and as the films are extremely thin and highly transparent, a considerable amount of light is reflected from the bottom surface of the film which adds itself to the light reflected from the top surface. Thus, in Example 2, the red ray 6500 shows a reflectivity of 39.5%. In Figure 1, the opaque lead sulfide reflects this ray to the extent of 26.5% and hence 73.5% of the light goes inside of the mirror film. Example 2 shows a transmission of 42% and the film must be traversed twice. Consequently, the light reflected from the bottom surface of the semi-transparent mirror layer, which again gets out at the top surface of the lead sulfide layer, is 73.5%×0.42×0.42 or 13%, which added to 26.5% reflected from the top surface, gives a total of 39.5% reflectivity for the red 6500 by the Example 2 mirror. This amplification by reflection from the bottom layer is of smaller consequence as the films become thicker and less transparent.

Example 17

A wine glass, or other hollow glass article, of ordinary colorless glass may be thoroughly cleaned and brought to 68 degrees Fahrenheit and the mixed solution used in the previous examples flowed into the same while maintaining agitation within the glass by a mechanical stirrer. In this way we can secure a reflective coating on the interior of the glass article. It will be a clear blue color, if the solution is poured out at the end of 22.6 minutes and the action stopped by flushing the glass with water. In a similar way other shaped transparent articles may be given a colored metallic reflection and the color may be varied, as in the previous examples, by varying the time of deposition.

Example 18

A plastic button, made from a plastic such as methyl methacrylate or Bakelite, is thoroughly cleaned and placed in the mixed solution used in the previous examples. The solution is preferably in a rotating container which continuously turns the button over. The solution may be drained out at the end of 15.2 minutes and flushed out with water. The button will be coated with a film of lead sulfide which will be of such a thickness as to give a bright orange yellow color. The button will have a high metallic reflection.

Example 19

If in preparing mirrors of Example 6 we arrange to blow a fine gentle current of air on the top of the glass plate, while it is in the pan being coated, and do so at several points, the resulting mirror will not be of one uniform color throughout but will show a variegated pattern in various colors as the deposited film thickness at various points on the glass surface will vary.

Example 20

If a pale green glass "Solex" is used in making a mirror following the procedure for Example 3, the mirror secured is of a beautiful brilliant green. If with this same glass a mirror is made following the procedure of Example 7, instead of a mauve mirror we secure a very brilliant blue-green mirror.

Thus, mirrors produced as in the above examples will have a desired color and reflectivity value. The color indicated in each example will be the color of the mirror when viewing it directly.

The method described above for producing mirror films is particularly useful in producing thin semi-transparent films in which interference effects will be obtained. However, it is to be understood that it can be used in producing other types of mirror films, either transparent or opaque, where light interference does not occur, when it is desired to obtain a film of a predetermined thickness and of uniform or variegated characteristics throughout its area.

It will be apparent from the above description that we have provided a novel and effective method of forming colored mirrors or other reflective surfaces of a wide range of color characteristics and of a wide range of reflectivity percentage characteristics which can be controlled as desired. The color values in the reflective mirror films are secured primarily by light interference effects and are permanent and inexpensive.

Various other advantages will be apparent from the preceding description and the following claims.

Having thus described our invention, what we claim is:

1. In the method of forming a mirror having an effective reflectivity to produce an adequate clear reflected image and also producing visually effective color by light ray interference, subjecting a transparent support element to an aqueous mixture comprising 1.06% sodium hydroxide, 1.23% lead acetate, 0.88% thiourea, 0.888% acetic acid, and 0.00018% sodium potassium tartrate, maintaining the aqueous mixture and the support element at a predetermined temperature, diluting the aqueous mixture with a large amount of water at a selected time to produce a continuous partially transparent light reflective film element of a uniform predetermined thickness falling within a range defined by a relatively low multiple of $$\frac{\lambda}{4N}$$

in which $\lambda$ represents a wave length of light at which the mirror gives a minimum of reflected light and $N$ represents the refractive index of the film element on the support element, and covering one of the elements with a substantially opaque coating.

2. The method of forming a mirror having an effective reflectivity to produce an adequate clear reflected image and also producing visually effective color by light ray interference comprising forming a solution containing 3.18% of sodium hydroxide and 0.00054% of sodium potassium tartrate, a solution containing 3.7% lead acetate and 0.264% acetic acid, and a solution containing 2.64% thiourea, mixing these solutions together in equal amounts, immediately contacting a surface of a support element with the mixture of solutions, controlling the length of time of the contact so as to deposit a lead sulfide film element on the support element with a thickness having a minimum of $$\frac{\lambda}{8N}$$

and a maximum of $$\frac{9\lambda}{4N}$$

in which λ represents a wave length of light at which the lead sulfide film element gives a minimum of reflected light and N represents the refractive index of the lead sulfide film element on the support element, and covering one of the elements with a substantially opaque coating.

3. A method according to claim 2 in which the deposition takes place with the mixture of solutions and the support element at a temperature between 60° and 90° Fahrenheit.

4. In the process of forming a mirror having an effective reflectivity to produce an adequate clear reflected image and also producing visually effective color by light ray interference in a continuous partially transparent light reflective metallic sulfide film inherently capable of producing color by light ray interference, the method comprising subjecting at a predetermined constant temperature a support to a solution potentially capable of forming the color producing metallic sulfide film by deposition comprising a water soluble alkali metal hydroxide, a water soluble organic sulfur compound decomposable to sulfide by reaction with said alkali, a water soluble metallic salt of a metal whose sulfide is water insoluble, and a water soluble organic metallic sulfide deposition reaction retarding agent containing hydroxyl groups, the alkali metal hydroxide being present by weight in a predetermined amount between 0.5% and 2.0%, the organic sulfur compound being present by weight in a predetermined amount between 0.2% and 5.0%, the soluble metallic salt being present by weight in a predetermined amount ranging up to 2.0%, and the organic retarding agent being present by weight in a predetermined amount ranging from a very small amount up to 6.0%, thereby depositing the continuous color producing film, and stopping the deposition reaction at a predetermined time depending upon the rate of deposition of the metallic sulfide film by controlling the length of time of the contact of the solution with the support, thereby producing a desired partially transparent pre-selected film thickness between $$\frac{\lambda}{8N}$$

and $$\frac{9\lambda}{4N}$$

inclusive, in which λ represents a wave length of light at which the film gives a minimum of reflected light and N represents the refractive index of the film.

5. The method of forming a colored mirror having an effective reflectivity to produce an adequate clear reflected image and also producing visually effective color by light ray interference in a continuous partially transparent light reflective metallic sulfide film element inherently capable of producing color by light ray interference comprising subjecting at a predetermined constant temperature a transparent support element to a solution potentially capable of forming the color producing metallic sulfide film element by deposition comprising a water soluble alkali metal hydroxide, a water soluble organic sulfur compound decomposable to sulfide by reaction with said alkali, a water soluble metallic salt of a metal whose sulfide is water insoluble, and a water soluble organic metallic sulfide deposition reaction retarding agent containing hydroxyl groups, the alkali metal hydroxide being present by weight in a predetermined amount between 0.5% and 2.0%, the organic sulfur compound being present by weight in a predetermined amount between 0.2% and 5.0%, the soluble metallic salt being present by weight in a predetermined amount ranging up to 2.0%, and the organic retarding agent being present by weight in a predetermined amount ranging from a very small amount up to 6.0%, thereby depositing the continuous color producing film element, stopping the deposition reaction at a predetermined time depending upon the rate of deposition of the metallic sulfide film element by controlling the length of time of the contact of the solution with the support element, thereby producing a desired partially transparent pre-selected film thickness between $$\frac{\lambda}{8N}$$

and $$\frac{9\lambda}{4N}$$

inclusive, in which λ represents a wave length of light at which the film element gives a minimum of reflected light and N represents the refractive index of the film element, and covering one of the elements with a substantially opaque coating.

6. The method of forming a mirror as set forth in claim 5 in which the time of deposition is so controlled as to produce a film element between approximately .024 micron and .065 micron.

7. In the process of forming a colored mirror, the method as set forth in claim 4 in which the solution is poured onto the support within a tray and rocking of the tray takes place during the deposition reaction.

8. In the process of forming a mirror having an effective reflectivity to produce an adequate clear reflected image and also producing visually effective color by light ray interference in a continuous partially transparent light reflective lead sulfide film inherently capable of producing color by light ray interference, the method comprising subjecting at a predetermined constant temperature a support to an aqueous mixture comprising 1.06% sodium hydroxide, 1.23% lead acetate, 0.88% thiourea, 0.888% acetic acid, and 0.00018% sodium potassium tartrate, thereby depositing the continuous lead sulfide film, and stopping the deposition reaction at a predetermined time depending upon the rate of deposition of the lead sulfide film by controlling the length of time of the contact of the solution with the support, thereby producing a desired partially transparent pre-selected film thickness of lead sulfide between $$\frac{\lambda}{8N}$$

and $$\frac{3\lambda}{8N}$$

inclusive, in which $\lambda$ represents a wave length of light at which the film gives a minimum of reflected light and $N$ represents the refractive index of the film.

9. In the process of forming a mirror having an effective reflectivity to produce an adequate clear reflected image and also producing visually effective color by light ray interference in a continuous partially transparent light reflective metallic sulfide film inherently capable of producing color by light ray interference, the method comprising subjecting at a predetermined constant temperature a support to a solution potentially capable of forming the color producing metallic sulfide film by deposition comprising a water soluble alkali metal hydroxide, a water soluble organic sulfur compound decomposable to sulfide by reaction with said alkali, a water soluble metallic salt of a metal whose sulfide is water insoluble, and sodium potassium tartrate, the alkali metal hydroxide being present by weight in a predetermined amount between 0.5% and 2.0%, the organic sulfur compound being present by weight in a predetermined amount between 0.2% and 5.0%, the soluble metallic salt being present by weight in a predetermined amount ranging up to 2.0%, and the sodium potassium tartrate being present in a very small amount less than 6.0%, thereby depositing the continuous color producing film, and stopping the deposition reaction at a predetermined time depending upon the rate of deposition of the metallic sulfide film by controlling the length of time of the contact of the solution with the support, thereby producing a desired partially transparent pre-selected film thickness between $$\frac{\lambda}{8N}$$

and $$\frac{9\lambda}{4N}$$

inclusive, in which $\lambda$ represents a wave length of light at which the film gives a minimum of reflected light and $N$ represents the refractive index of the film.

WILLIAM H. COLBERT.
WILLARD L. MORGAN.